(12) United States Patent
Zhao et al.

(10) Patent No.: US 10,678,388 B2
(45) Date of Patent: Jun. 9, 2020

(54) LARGE SIZE CAPACITIVE TOUCH SCREEN, CONNECTION METHOD BETWEEN INNER SCREEN AND OUTER SCREEN OF LARGE SIZE CAPACITIVE TOUCH SCREEN, AND CONNECTOR

(71) Applicant: Shenzhen Sundenal Technology Co. Ltd, Shenzhen (CN)

(72) Inventors: Xiaogang Zhao, Shenzhen (CN); Zuhui Chen, Shenzhen (CN); Hongtao Tian, Shenzhen (CN); Ping Huang, Shenzhen (CN); Hui Huang, Shenzhen (CN); Zhaomin Zhu, Shenzhen (CN)

(73) Assignee: SHENZHEN SUNDENAL TECHNOLOGY CO. LTD, Shenzhen (CN)

( * ) Notice: Subject to any disclaimer, the term of this patent is extended or adjusted under 35 U.S.C. 154(b) by 81 days.

(21) Appl. No.: 15/972,126

(22) Filed: May 5, 2018

(65) Prior Publication Data

US 2019/0129532 A1 May 2, 2019

(30) Foreign Application Priority Data

Oct. 30, 2017 (CN) .......................... 2017 1 1041470

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 3/04164* (2019.05); *G06F 3/0412* (2013.01); *G06F 3/0446* (2019.05)

(58) Field of Classification Search
CPC .... G06F 3/044; G06F 3/04164; G06F 3/0416; G06F 3/0412; G06F 3/0446
See application file for complete search history.

(56) References Cited

U.S. PATENT DOCUMENTS

| | | | | |
|---|---|---|---|---|
| 2003/0201985 | A1* | 10/2003 | Katakami | G06F 3/045 345/173 |
| 2004/0233175 | A1* | 11/2004 | Chuang | G06F 3/045 345/173 |
| 2011/0057892 | A1* | 3/2011 | Kwak | G06F 3/0412 345/173 |
| 2011/0134056 | A1* | 6/2011 | Kim | G06F 3/0412 345/173 |
| 2012/0127092 | A1* | 5/2012 | Lee | G06F 3/044 345/173 |
| 2015/0268779 | A1* | 9/2015 | Yang | G06F 3/0412 345/173 |

* cited by examiner

*Primary Examiner* — Jonathan A Boyd
(74) *Attorney, Agent, or Firm* — Dragon Sun Law Firm, PC; Jinggao Li, Esq.

(57) ABSTRACT

Embodiments provide a capacitive touch screen, including: an outer screen, having a driving unit array and a sensing unit array; an inner screen; and a connector connecting the outer screen to the inner screen. The connector includes at least one first surface connected to a surface of the outer screen, and at least one second surface connected to a surface of the inner screen. In a non-visible region of the outer screen, a plurality of electrode wires from the driving unit array or from the sensing unit array are divided into at least two groups, and the at least two groups of electrode wires are led out separately. The at least one first surface does not contact the plurality of electrode wires.

7 Claims, 10 Drawing Sheets

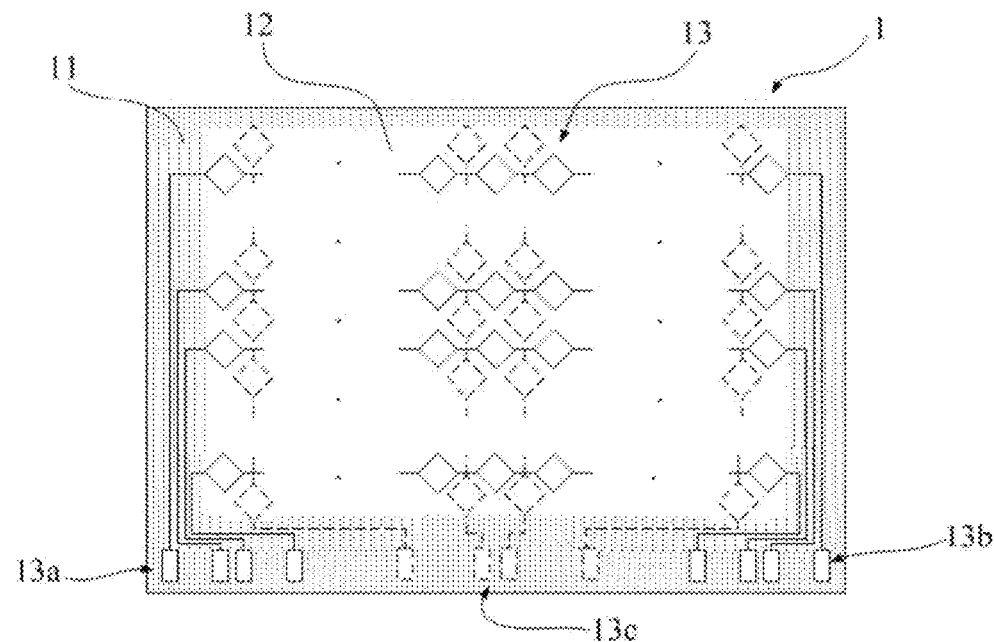
FIG. 4
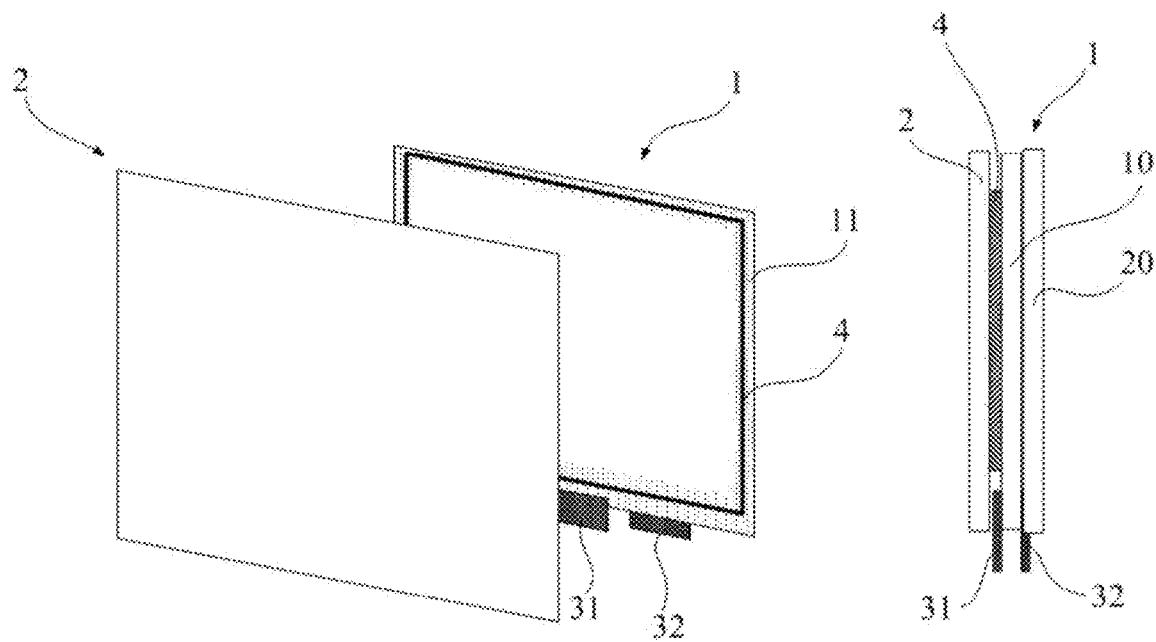
FIG. 5
FIG. 6

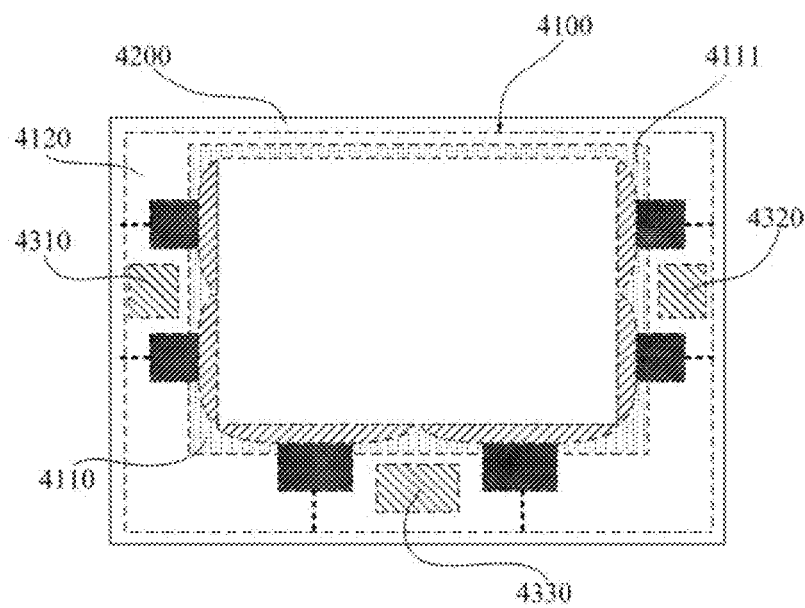
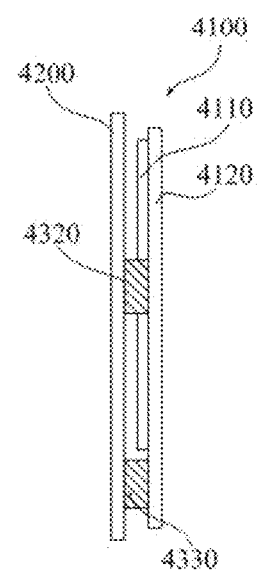
FIG. 23      FIG. 24
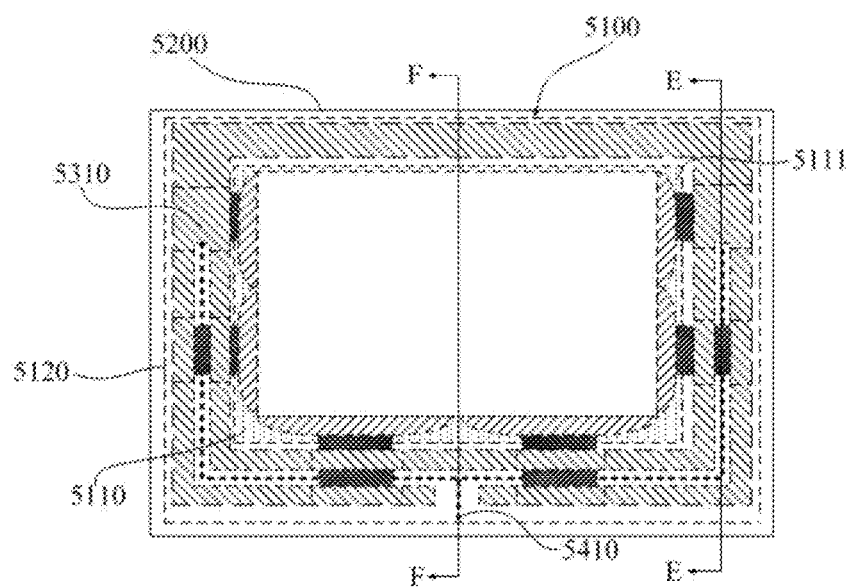
FIG. 25

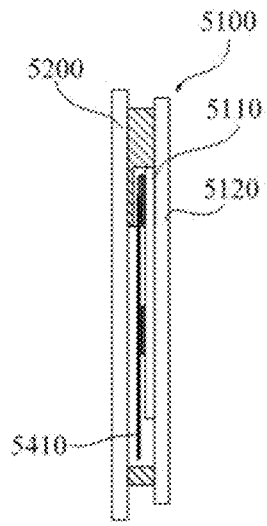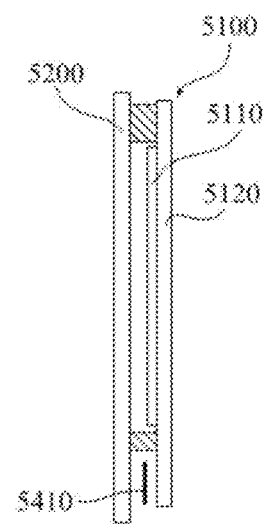
FIG. 26  FIG. 27
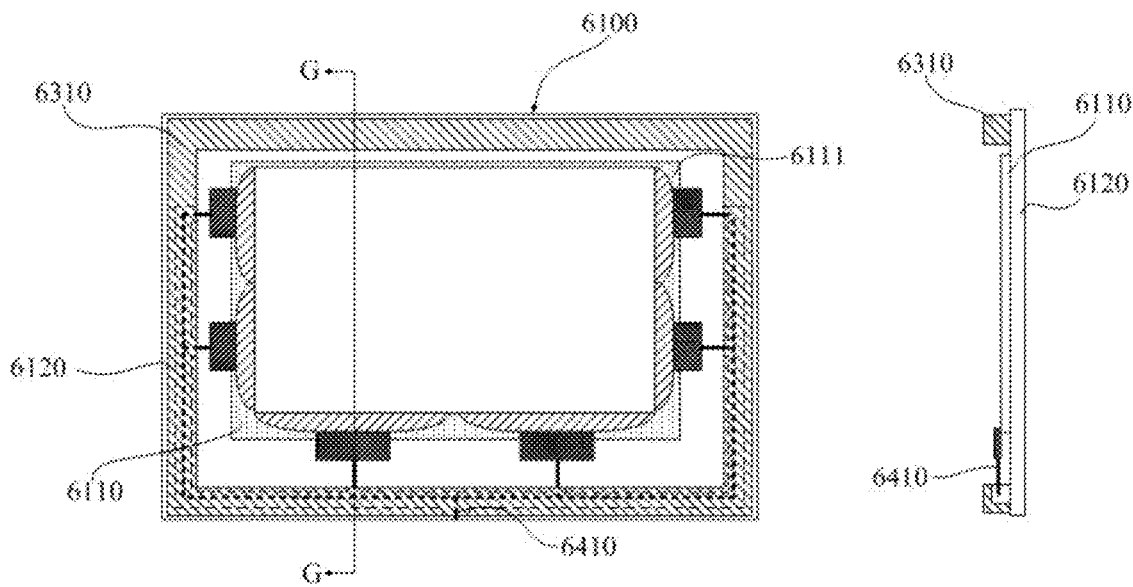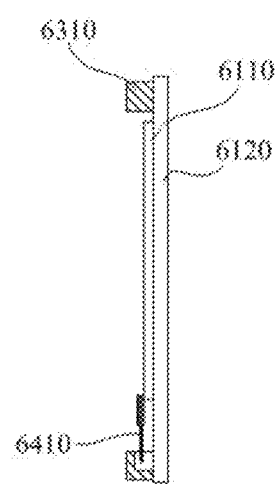
FIG. 28  FIG. 29

LARGE SIZE CAPACITIVE TOUCH SCREEN, CONNECTION METHOD BETWEEN INNER SCREEN AND OUTER SCREEN OF LARGE SIZE CAPACITIVE TOUCH SCREEN, AND CONNECTOR

CROSS REFERENCE TO RELATED APPLICATIONS

This application is based upon and claims priority to Chinese Patent Application No. CN201711041470.2, filed on Oct. 30, 2017, the entire contents of which are incorporated herein by reference.

TECHNICAL FIELD

The present disclosure relates to the technical field of capacitive touch screens, particularly to a large size capacitive touch screen, a method of connecting an inner screen to an outer screen of the large size capacitive touch screen, and a connector.

BACKGROUND OF THE INVENTION

A touch screen provides a man-machine interaction mode, which is currently the simplest, most convenient and most natural interaction mode. The touch screen is widely used in information inquiry, industrial control, self-service, multimedia teaching, electronic games, etc. In particular, due to the fact that a larger visual area (or an operable area) can be provided, the large size (20 inches or larger) touch screen has come into more widespread use.

Among various touch screen types, the capacitive touch screen is one of large size touch screens, and has a better application prospect due to accuracy, usability, abrasion resistance, long service life, etc. An example of a large sized capacitive touch screen is shown in FIGS. 1-3. The touch screen includes an outer screen 1 and an inner screen 2 (see FIG. 2), which are connected via a bonding element 4 (e.g. a double-faced adhesive tape, an adhesive, etc.). The outer screen 1 is used for touch control, and the inner screen 2 is used for display. In the present example, the outer screen 1 is of a single-piece structure, and only includes a touch control layer.

A sensing unit array and a driving unit array (collectively referred to as 13) are provided on a touch control layer of the outer screen 1 having a single-piece structure in a single-sided arrangement. The sensing unit array and the driving unit array are arranged on a same surface of the outer screen 1 (in FIG. 1, the surface is the front surface of the outer screen 1, which is represented by the front surface of the drawing sheet). Specifically, in the example shown in FIG. 1, the sensing unit array is arranged on the front surface of the outer screen 1 and is particularly arranged in the visible region 12 of the outer screen 1. The sensing unit array is formed by arranging a plurality of rows of sensing units which are connected in series. Two ends of each row of sensing units are respectively connected to sensing electrodes 13a and 13b arranged at a lower edge of the outer screen 1, through an electrode wire (usually made of a silver paste material). The driving unit array is also arranged on the front surface of the outer screen 1, and particularly arranged in the visible area 12 of the outer screen 1. The driving unit array is formed by arranging a plurality of columns of driving units which are connected in series. As to two ends of each column of driving units, the upper end is suspended, while the lower end is connected to a driving electrode 13c arranged at the lower edge of the outer screen 1, through an electrode wire (usually made of the silver paste material). The electrode wires, the sensing electrodes and the driving electrodes are all arranged within the non-visible region 11 of the outer screen 1. A plurality of sensing electrodes 13a are electrically connected to an FPC (flexible printed circuit) 31 which is fixed at the lower edge of the outer screen 1 (the sensing electrodes 13b are similarly electrically connected to another FPC). A plurality of driving electrodes 13c are electrically connected to the FPC 32.

Another example of a large size capacitive touch screen is shown in FIGS. 4-6. The touch screen includes an outer screen 1 and an inner screen 2, which are connected to each other through a bonding element 4 (see FIG. 5). Wherein the bonding element 4 and the inner screen 2 are the same as those of the previous example. The outer screen 1 is of a fully-attached structure, and the outer screen 1 includes a touch control layer 10 and a protection layer (such as a glass plate) 20. The protective layer 20 is fully attached to the touch control layer 10 to form an outer screen 1 having a fully-attached structure, as shown in FIG. 6. The touch control layer of the outer screen 1 having a fully-attached structure adopts two-sided arrangement. The sensing unit array and the driving unit array are respectively arranged on two surfaces of the outer screen 1 (in FIG. 4, the two surfaces are the front surface and the back surface of the outer screen 1, and the front surface and the back surface of the outer screen 1 are respectively represented by the front surface and the back surface of the drawing sheet; units depicted with the dotted lines in FIG. 4 are the ones arranged on the back surface). Specifically, in the example shown in FIG. 4, the sensing unit array is arranged on the front surface of the outer screen 1, while the driving unit array is arranged on the back surface of the outer screen 1. Except for the difference that the sensing unit array and the driving unit array are respectively arranged on the two surfaces of the outer screen 1, the outer screen 1 in the present example is the same as that of the previous example.

A large size (more than 20 inches) capacitive touch screen has many rows of sensing units and many columns of driving units, and thus there are a lot of electrode wires connecting these rows of sensing units and columns of driving units. These electrode wires occupy most of the non-visible region 11 of the outer screen 1. Therefore, in the prior art, when the outer screen 1 and the inner screen 2 are connected, the bonding element 4 is inevitably applied on the electrode wires in the non-visible region 11 of the outer screen 1, as shown in FIGS. 2 and 5. The electrode wires are generally made of a silver paste material. The adhesion force between these electrode wires and the surface of the outer screen 1 is not strong enough, so that the inner screen 2 and the outer screen 1 cannot be effectively connected. Particularly, when the large size touch screen needs to be vertically placed for a long time period (as shown in FIGS. 3 and 6), if no extra device for supporting the inner screen 2 and the outer screen 1 is provided, the weight of the inner screen 2 and the outer screen 1 applies a tearing force on the electrode wires, wherein the tearing force is parallel to the surface of the outer screen 1. Thus, the electrode wires are likely to shift and even fall off from the surface of the outer screen 1, which makes the touch screen inoperable. Furthermore, as to the outer screen 1 of the fully-attached structure shown in FIGS. 4-6, due to the fact that a large area of the non-visible region 11 accommodating a large number of electrode wires is needed, the area of the touch control layer 10 also needs to be large. It is unlikely to use a protection layer 20 having a larger area which can make the inner screen 2 fixed to the protective layer 20 through the bonding element 4. Therefore, the bonding element 4 needs to be at least partially applied on the electrode wires in the non-visible region 11 of the touch control layer 20.

Therefore, to solve the above problems, a person of ordinary skill in the art is dedicated to developing a large size capacitive touch screen, a method of connecting the inner screen to the outer screen, and a connector.

SUMMARY OF THE INVENTION

In order to fulfill the objective, some embodiments of the present disclosure provide a large size capacitive touch screen, including an outer screen having a driving unit array and a sensing unit array, an inner screen, and a connector connecting the outer screen to the inner screen. The connector includes at least one first surface connected to a surface of the outer screen, and at least one second surface connected to a surface of the inner screen. In a non-visible region of the outer screen, a plurality of electrode wires from the driving unit array or from the sensing unit array are divided into at least two groups, and the at least two groups of electrode wires are led out separately. The at least one first surface does not contact the plurality of electrode wires.

Embodiments further provide a large size capacitive touch screen, wherein the outer screen includes a touch control layer, and the driving unit array and the sensing unit array are formed on the touch control layer. The non-visible region is formed by an edge part of the touch control layer, and the driving unit array and the sensing unit array are not arranged on the edge part.

Embodiments further provide a large size capacitive touch screen, wherein the outer screen includes a protection layer and a touch control layer. The touch control layer is smaller than the protection layer, and the touch control layer is attached to a middle part of the protection layer. The driving unit array and the sensing unit array are formed on the touch control layer. The non-visible region is formed by a first edge part of the touch control layer and a second edge part of the protection layer, the driving unit array and the sensing unit array are not arranged on the first edge part, and the second edge part of the protection layer does not contact the touch control layer.

Embodiments further provide a large size capacitive touch screen, wherein the non-visible region is in a shape of rectangular frame, and includes a first strip-shaped area, a second strip-shaped area, a third strip-shaped area, and a fourth strip-shaped area.

The first strip-shaped area is opposite to the second strip-shaped area, the third strip-shaped area is opposite to the fourth strip-shaped area, and the third strip-shaped area and the fourth strip-shaped area are between the first strip-shaped area and the second strip-shaped area. The connector includes at least two first surfaces, wherein one first surface is connected to a middle part of the first strip-shaped area, and an other first surface is connected to a middle part of the second strip-shaped area.

Embodiments further provide a large size capacitive touch screen, wherein the connector includes at least three first surfaces, wherein another first surface is connected to a middle part of the third strip-shaped area.

Embodiments further provide a large size capacitive touch screen, wherein the connector includes at least two first grooves, each first groove configured to accommodate a flexible printed circuit. Each group of the at least two groups of electrode wires is led out to a corresponding flexible printed circuit and electrically connected to the corresponding flexible printed circuit.

Embodiments further provide a large size capacitive touch screen, wherein the connector is further provided with a channel or a second groove, which is connected to the first groove. The channel or the second groove extends in the connector, an opening is formed in one edge of the connector, and the opening faces an exterior of the touch screen. A plurality of wires from the flexible printed circuits extend within the channel or the second groove, and are led out of the touch screen from the opening.

Embodiments further provide a large size capacitive touch screen, wherein the non-visible region is provided with at least two flexible printed circuits, and the at least two flexible printed circuits are outside the connector. Each group of the at least two groups of electrode wires is led out to one of the at least two flexible printed circuits, and electrically connected to the one of flexible printed circuits. The connector further includes a channel or a second groove, the channel or the second groove extends in the connector, an opening is formed in one edge of the connector, and the opening faces an exterior of the touch screen. A plurality of wires from the at least two flexible printed circuits extend within the channel or the second groove, and are led out of the touch screen from the opening.

Embodiments further provide a large size capacitive touch screen, wherein the first surface is connected to a surface of the outer screen through a double-sided adhesive tape or an adhesive. The second surface is connected to a surface of the inner screen through a double-sided adhesive or an adhesive.

Embodiments further provide a large size capacitive touch screen, wherein the connector is of a single structure, or is of a structure formed by combining a plurality of structural portions.

Embodiments further provide a large size capacitive touch screen, wherein the connector is made of metal, plastic or wood.

Further, embodiments provide a method of connecting an inner screen and an outer screen of a large size capacitive touch screen, including: providing a connector; connecting at least one first surface of the connector to a surface of the outer screen, and connecting at least one second surface of the connector to a surface of the inner screen; dividing, in a non-visible region of the outer screen, a plurality of electrode wires from the driving unit array or from the sensing unit array into at least two groups, and leading the at least two groups of electrode wires out separately. The at least one first surface does not contact the plurality of electrode wires.

Further, embodiments provide a connector between an inner screen and an outer screen of a large size capacitive touch screen. The connector includes at least one first surface, configured for being connected to a surface of the outer screen, and at least one second surface, configured for being connected to a surface of the inner screen. The connector includes at least two first grooves, each first groove configured to accommodate a flexible printed circuit. The connector further includes a channel or a second groove, the channel or the second groove extends in the connector, an opening is formed in one edge of the connector.

Embodiments further provide a connector, wherein the first surface is connected to a surface of the outer screen through a double-sided adhesive tape or an adhesive. The second surface is connected to a surface of the inner screen through a double-sided adhesive or an adhesive.

Embodiments further provide a connector, wherein the connector is of a single structure, or is of a structure formed by combining a plurality of structural portions.

Embodiments further provide a connector, wherein the connector is made of metal, plastic or wood.

Advantages of some embodiments are provided below. The connector is connected between the inner screen and the outer screen of the touch screen, so that the electrode wires on the outer screen are led out in groups. Accordingly, the area of the non-visible region occupied by the electrode wires is obviously reduced, and thus the connector can be connected to the surface of the outer screen without contacting the electrode wires. Therefore, the problem in the prior art that an inner screen is connected to the outer screen through electrode wires is effectively solved, thereby avoiding a destructive effect on the electrode wires due to gravities of the inner screen and the outer screen without an extra support. Therefore, a reliable and durable connection between the inner screen and the outer screen is realized, without degrading an electrical performance of the touch screen. Some embodiments of the touch screen are particularly suitable for large size capacitive touch screens.

Concepts, specific structures and advantages of some embodiments are further described below with reference to the drawings, so as to fully understand the objectives, the features and the advantages of the embodiments of the present disclosure.

BRIEF DESCRIPTION OF THE DRAWINGS

FIG. 4 shows an outer screen of another touch screen in the prior art, which is a fully-attached structure.

FIG. 5 shows a structural exploded view of a touch screen having the outer screen as shown in FIG. 4, the inner screen and the outer screen being connected to each other.

FIG. 6 is a side view of the touch screen shown in FIG. 5, the inner screen and outer screen being connected to each other.

FIG. 23 schematically shows a front view of a touch screen in a sixth embodiment.

FIG. 24 is a right side view of the structure shown in FIG. 23, only an inner screen, an outer screen, and a connector being shown.

FIG. 25 schematically shows a front view of a touch screen in a seventh embodiment.

FIG. 26 is a cross-sectional view of the structure in an E-E direction shown in FIG. 25.

FIG. 27 is a cross-sectional view of the structure in an F-F direction shown in FIG. 25.

FIG. 28 schematically shows a front view of a touch screen in an eighth embodiment, an inner screen not being shown in FIG. 28.

FIG. 29 is a cross-sectional view of the structure in a G-G direction shown in FIG. 28.

DETAILED DESCRIPTION OF THE INVENTION

Figure 1:
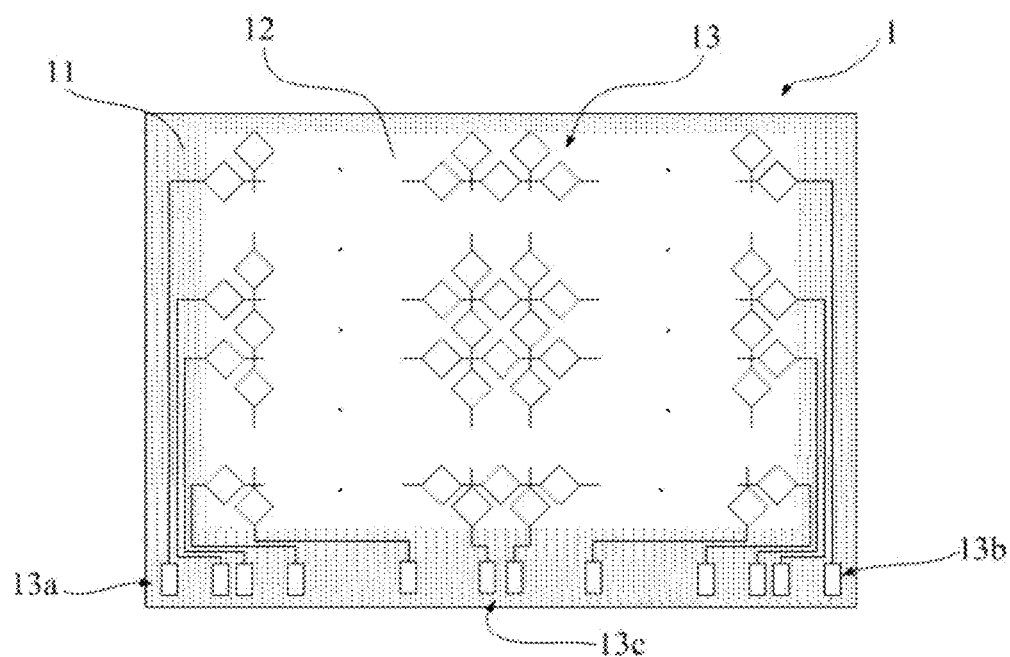
FIG. 1 shows an outer screen of a touch screen in the prior art, the outer screen being of a single-piece structure.
Figures 2, 3:
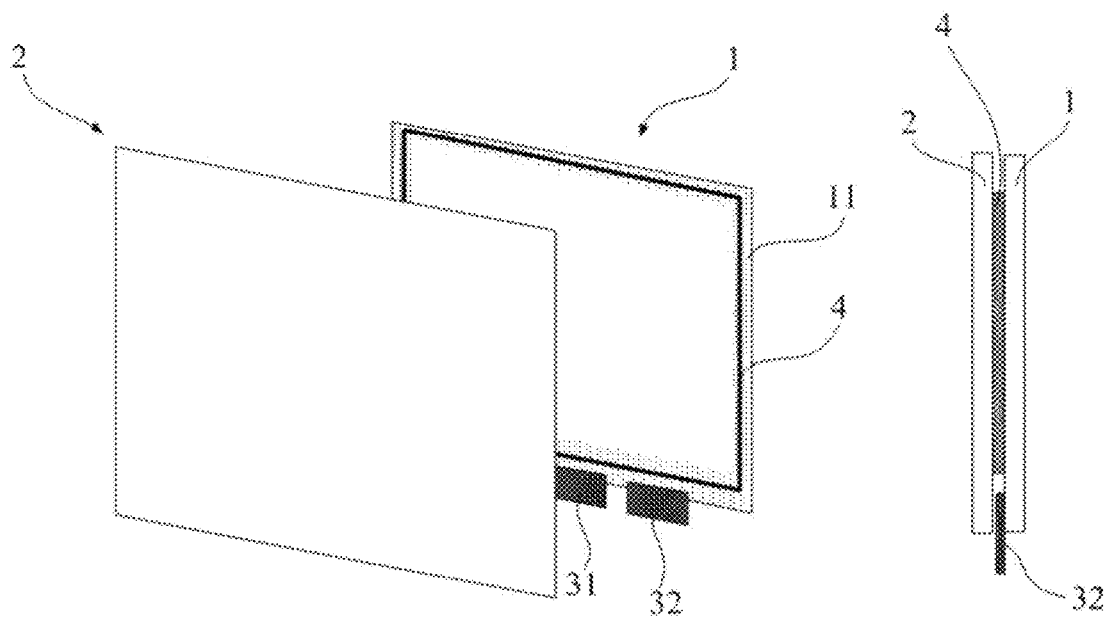
FIG. 2 shows a structural exploded view of a touch screen having an outer screen as shown in FIG. 1, the touch screen including an inner screen and an outer screen.
FIG. 3 is a side view of the touch screen shown in FIG. 2, the inner screen and the outer screen being connected to each other.
Figures 7, 8:
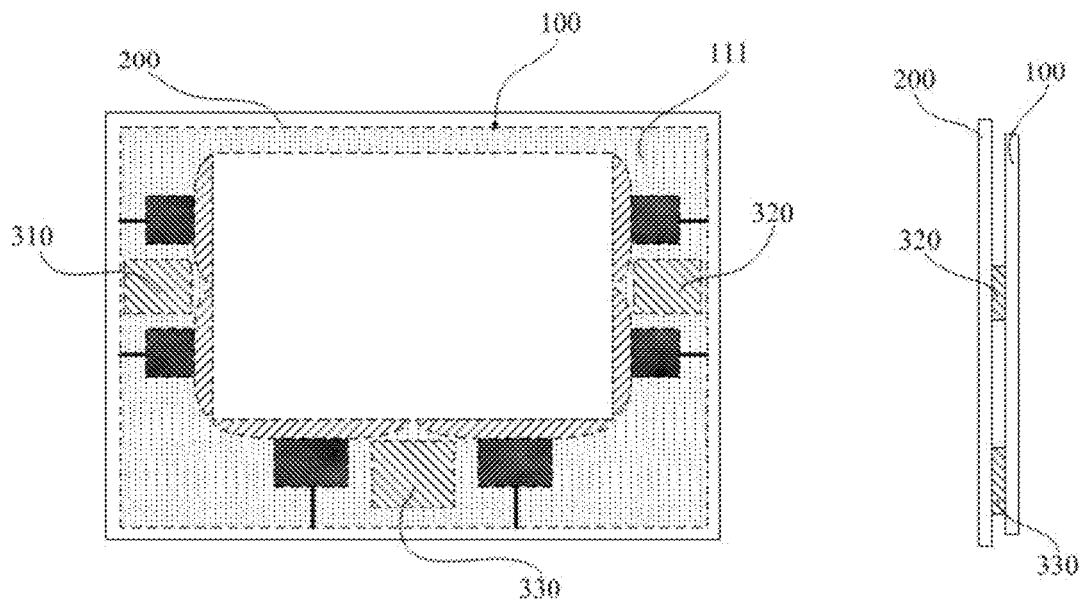
FIG. 7 schematically shows a front view of a touch screen in a first embodiment.
FIG. 8 is a right side view of the touch screen shown in FIG. 7.

As shown in FIGS. 7-10, in a first embodiment, the outer screen 100 and the inner screen 200 of the touch screen are of a rectangular plate-shaped structure. The structure of the driving (sensing) unit array is the same as that of the outer screen 1 having a single-piece structure as described in the "background of the invention", and thus is not shown in the FIGS. 7-10. FIG. 7 is a front view of a touch screen viewed from an inner screen 200 to an outer screen 100, wherein a part, which is shielded by the inner screen, is depicted by a dotted line. FIG. 8 is a right side view of the touch screen shown in FIG. 7. As can be seen from the FIGS. 7 and 8, three connectors 310, 320 and 330 are used in the embodiment, and are plastic (or other materials, such as metal, wood, etc.) plate-shaped structures. The three connectors 310, 320 and 330 are respectively arranged between the outer screen 100 and the inner screen 200, and one surface of each connector (the second surface) is connected to the surface of the inner screen 200, and the other surface of each connector (the first surface) is connected to the surface of the non-visible region 111 of the outer screen 100.

In an embodiment, the inner screen and outer screen may have substantially the same size. In FIGS. 7-10, the inner screen and outer screen are drawn with different sizes to make them more clear in the figures. However, this is only for illustrative purpose, and is not intended to limit the real size and size relation.

Figure 9:
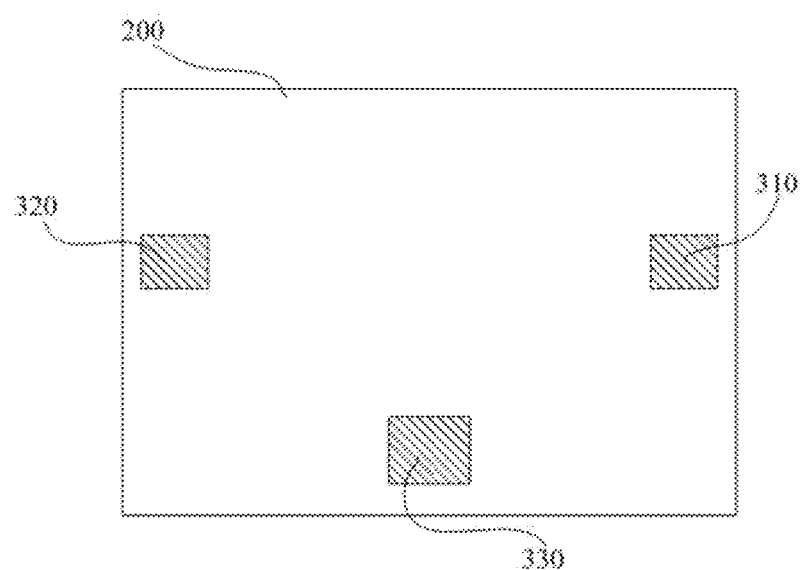
FIG. 9 shows an inner screen of the touch screen shown in FIG. 7 and a connector, the inner screen and the connector being connected to each other.

FIG. 9 shows an inner screen 200 and three connectors 310, 320 and 330 connected to the inner screen 200 in the embodiment. The view angle of FIG. 9 is just opposite to that of FIG. 7. The surfaces of the three connectors 310, 320, and 330 facing the interior of the drawing sheet, as shown in FIG. 9, are second surfaces. The second surfaces are connected to the surface of the inner screen 200 facing the exterior of the thawing sheet.

Figure 10:
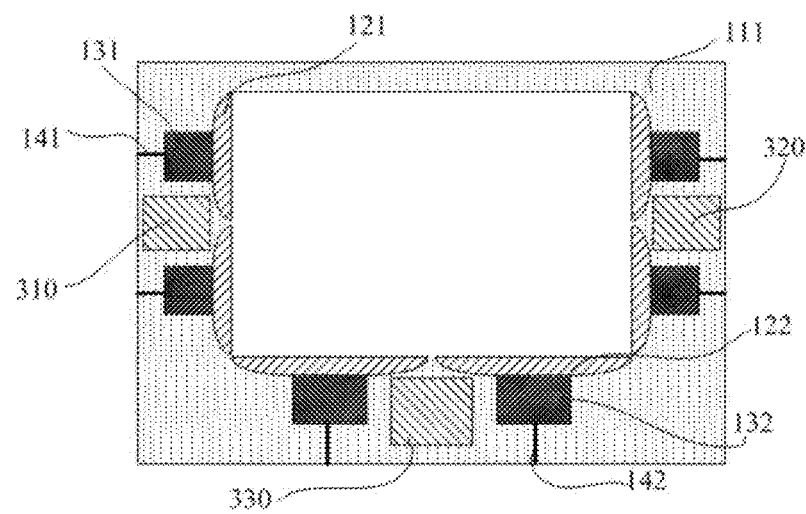
FIG. 10 shows an outer screen of the touch screen shown in FIG. 7 and a connector, the outer screen and the connector being connected to each other.

FIG. 10 shows an outer screen 100 and three connectors 310, 320 and 330 connected to the outer screen 100 in the embodiment. The view angle of FIG. 10 is the same as that of FIG. 7. The surfaces of the three connectors 310, 320, and 330 facing the interior of the drawing sheet, as shown in FIG. 10, are first surfaces. The first surfaces are connected to the surface of the outer screen 100 facing the exterior of the drawing sheet.

Specifically, the non-visible region 111 of the outer screen 100 in the embodiment is of a rectangular frame structure, and includes four strip-shaped areas which are connected end to end. As shown in FIG. 10, the four strip-shaped areas are an upper strip-shaped area, a lower strip-shaped area, a left strip-shaped area and a right strip-shaped area respectively. The upper strip-shaped area and the lower strip-shaped area are opposite to each other, while the left strip-shaped area and the right strip-shaped area are opposite to each other. The upper strip-shaped area and the lower strip-shaped area are longer, while the left strip-shaped area and the right strip-shaped area are shorter. The first surface of connector 310 is connected to the middle part of the left strip-shaped area of the non-visible region 111. The first surface of the connector 320 is connected to the middle part of the right strip-shaped area of the non-visible region 111. The first surface of the connector 330 is connected to the middle part of the lower strip-shaped area of the non-visible region 111.

In an embodiment, the connectors 310, 320 and 330 may partially protrude out of the edge of the outer screen 100, namely, the first surfaces of the three connectors 310, 320 and 330 are partially connected to the surface of the outer screen 100. For example, the right half portion of the first surface of the connector 310 is connected to the outer screen 100. The left half portion of the first surface of the connector 320, and the upper half portion of the first surface of the connector 330 are connected to the outer screen 100. In accordance with the design requirements, the user may determine sizes of these portions of the first surfaces, which are connected to the outer screen 100.

It should be noted that, in other embodiments, the connectors may not protrude out of the edge of the outer screen. Thus, the first surfaces of the connectors are all connected to the surface of the outer screen 100.

As shown in FIG. 10, similar to the outer screen 1 described in the "background of the invention", in the embodiment, two ends of each row of the driving/sensing unit array are both connected to electrode wires which extend into the non-visible region 111. In the non-visible region 111, the electrode wires further extend and connected to an FPC which is arranged in the non-visible region 111. Furthermore, one end of each column is also connected to an electrode wire extending to the non-visible region 111. In the non-visible region 111, the electrode wire further extends to another FPC which is connected to the non-visible region 111. In this embodiment, the electrode wires extend in different groups.

As shown in FIG. 10, a multi-row sensing (or driving) unit array is arranged on the outer screen 100, and the electrode wires led out from the left end of the unit array are divided into an upper group and a lower group. The upper group extends through the area 121 to the FPC 131 and is electrically connected to the FPC 131, and a wire 141 is independently led out from the FPC 131. The lower group similarly extends to another FPC in an area lower than the area 121. The two FPCs are respectively arranged on two sides of the connector 310, and the two areas where two groups of electrode wires extend are respectively arranged on the upper side and the lower side of the connector 310. In other words, the electrode wires led out from the left end of the multi-row sensing (or driving) unit array extend on the two sides (the upper side and the lower side) of the first surface of the connector 310, respectively. It should be noted that, in the embodiment as shown in FIG. 10, the two areas where two groups of electrode wires extend are arranged right above and right below the connector 310. However, in other embodiments, the two areas may not be located right above and right below the connector 310, instead, the two areas are located above and below the connector 310. In the present disclosure, the extension of the electrode wires on the two sides of the first surface should be interpreted broadly. That is, the plurality of electrode wires extend in groups, wherein one group of electrode wires extend towards one side of the first surface, while the other group of electrode wires extend towards the other side of the first surface. Similarly, electrode wires led out from the right end of the multi-row sensing (or driving) unit array respectively extend on two sides (the upper side and the lower side) of the first surface of the connector 320.

In addition, as shown in FIG. 10, driving (or sensing) unit array is arranged on the outer screen 100, and electrode wires led out from a lower end of a multi-column driving (or sensing) unit array are divided into a left group and a right group. The right group of electrode wires extends through the area 122 to the FPC 132 and is electrically connected to the FPC 132. The wire 142 is independently led out from the FPC 132. The left group similarly extends to another FPC through the area on the left of the area 122. In other words, the electrode wires led out from the lower end of the multi-column driving (or sensing) unit array are respectively arranged on two sides (the left side and the right side) of the first surface of the connector 330.

It can be noted that, compared with an existing outer screen 1 described in the "background of the invention", the outer screen 100 in this embodiment has more FPCs and more wires led out from the FPCs.

It should be noted that, in an embodiment, the connectors are rectangular, but it is not intended to limit the shape of the connectors. In other embodiments, the connectors can be designed in other shapes, such as a circle, a triangle, a polygon, irregular shape, etc. In an embodiment, the connectors do not protrude out of the edge of the inner screen. In addition, the thicknesses of the connectors determine a gap between the inner screen and the outer screen. The thicknesses can be set according to requirements of the user. In an embodiment, if only one connector is used between the inner screen and the outer screen, the connector may have a uniform thickness (the thickness of the connector herein refers to a distance between the first surface and the second surface of the connector, regardless of grooves which may be formed therein), for example, 0.01-3 cm. In other embodiments, if a plurality of connectors are used, the connectors may have the same uniform thickness, for example, 0.01-3 cm.

It should be noted that, if the inner screen is connected to the outer screen having a single-piece structure, the connector can be the bonding element in the prior art (for example, the bonding element 4 described in the "background of the invention"). A thickness of the connector can be relatively small, such as 0.01-1.5 cm in other embodiments, the connector can be a solid structure made of a material, such as plastic, wood, metal, etc. In this case, a connection between the first surface of the connector and the surface of the outer screen, and a connection between the second surface of the connector and the surface of the inner screen are achieved by a material, such as a double-faced adhesive tape, an adhesive, etc.

Figure 11:
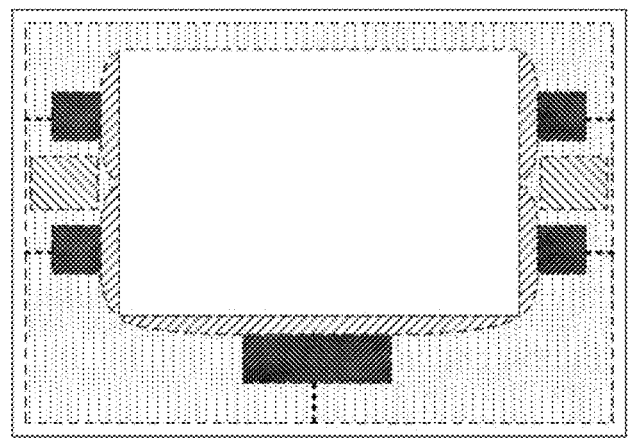
FIG. 11 schematically shows a front view of a touch screen in a second embodiment.
Figure 12:
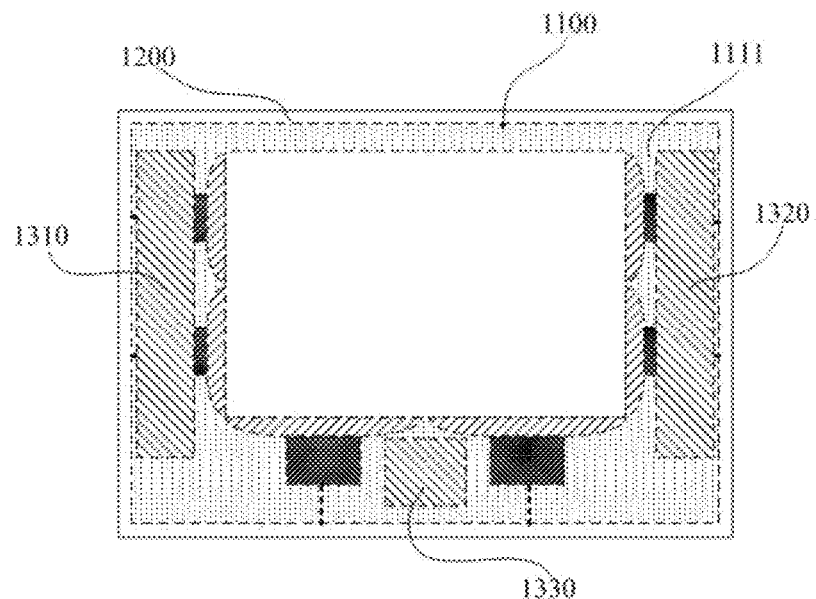
FIG. 12 schematically shows a front view of a touch screen in a third embodiment.

Additionally, a person of ordinary skill in the art can understand that the number of the connectors used in the embodiment is not limited. The user can select more or fewer connectors in accordance with requirements of the user. For example, in a second embodiment as shown in FIG. 11, there is no connector in a lower strip-shaped area of the non-visible region of the outer screen. In other embodiments, the user can also provide three or more connectors in the left strip-shaped area of the non-visible region. The number of connectors provided in the right strip-shaped area may be different from the number of connectors provided in the left strip-shaped area.

Also, as shown in a third embodiment described in FIGS. 12-15, the user can use a connector having different number of first surfaces. In this embodiment, the inner screen 1200 and the outer screen 1100 are connected through three connectors 1310, 1320 and 1330. The connector 1330 is similar to the connector 330 as shown in FIGS. 7-10. Each of the connectors 1310 and 1320 has one second surface connected to the surface of the inner screen 1200, while having multiple (for example, three) first surfaces connected to the outer screen 1100. Except for the difference in the structure and the shape, the connectors 1310 and 1320 are similar to the connectors 310 and 320 as shown in FIGS. 7-10.

Figures 13, 14:
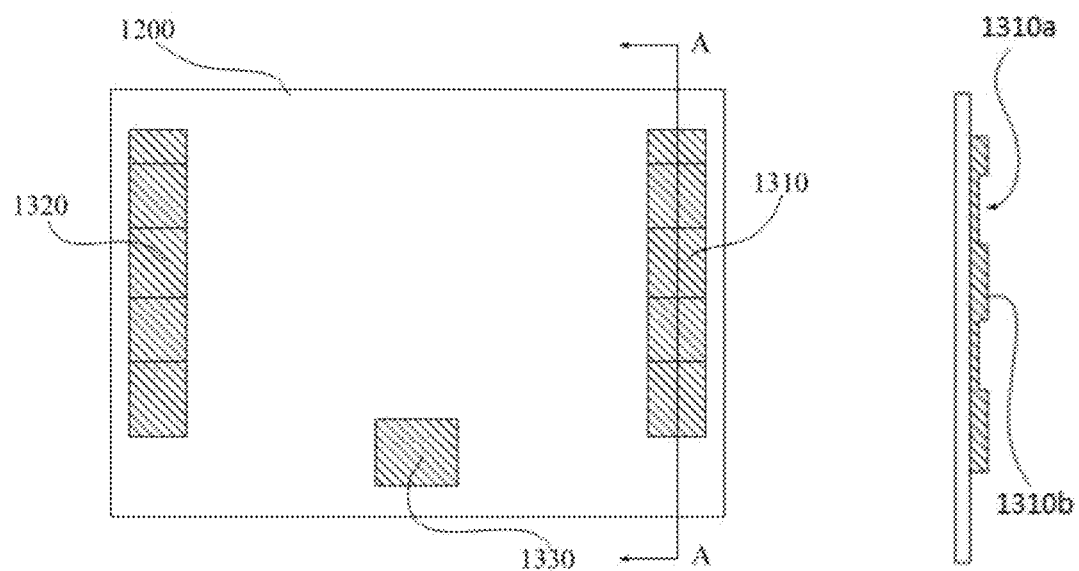
FIG. 13 shows an inner screen of the touch screen shown in FIG. 12 and a connector, the inner screen and the connector being connected to each other.
FIG. 14 is a cross-sectional view of the structure in an A-A direction shown in FIG. 13.

As shown in FIGS. 13 and 14, the connectors 1310 and 1320 are elongated. The second surface (the surface facing the exterior of the drawing sheet in FIG. 12, and the surface facing the interior of the drawing sheet in FIG. 13) of the connectors 1310 or 1320 is in a shape of long rectangle. Two grooves are formed on the side of first surfaces of the connectors 1310 or 1320, and the two grooves are formed among three first surfaces. FIG. 14 shows a cross-section of the connector 1310 (In this embodiment, the connector 1320 has a same structure as that of the connector 1310). The two grooves, such as grooves 1310a, are formed among the three first surfaces, such as the first surface 1310b. The grooves and first surfaces are alternately arranged with each other. The two grooves are each used for accommodating at least a part of the FPC (see FIG. 15). The structure (depth, shape, etc.) of each groove can be designed in terms of the FPC to be accommodated. In addition, in other embodiments, the two grooves can also accommodate some of electrode wires and/or wires led out from FPCs. In this case, the electrode wires and/or wires need to be considered when designing the structure of each groove.

Furthermore, in other embodiments, the connector 1310 only has a first surface 1310b between two grooves, without the other two first surfaces. In another embodiments, the connector 1310 has two first surfaces, including the first surface 1310b between two grooves. In these two cases, the connector 1310 can still realize the same function of the connector 1320.

Figure 15:
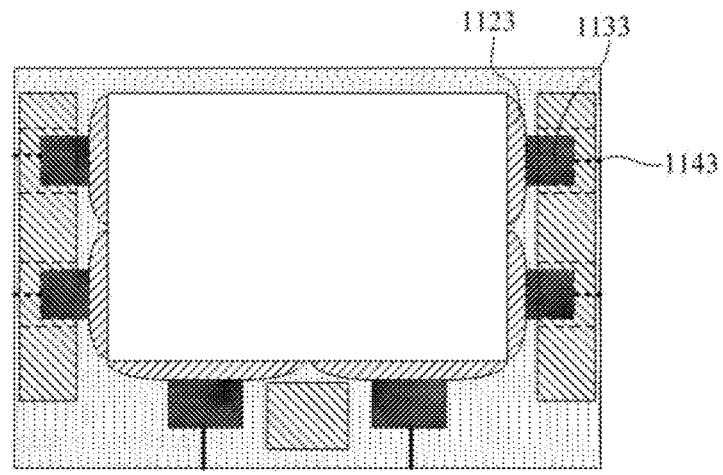
FIG. 15 shows an outer screen of the touch screen shown in FIG. 12 and a connector, the outer screen and the connector being connected to each other.

FIG. 15 illustrates a plurality of electrode wires extending out from the left end of the multi-row sensing (or driving) unit array on an outer screen 1100. The plurality of electrode wires are divided into an upper group and a lower group. The two groups respectively extend to two FPCs accommodated in the two grooves of the connector 1310 and are electrically connected to the two FPCs. Two wires respectively led out from the two FPCs, go through the two grooves, and are then led out of the touch screen. Similarly, a plurality of electrode wires extending out of the right end are also divided into an upper group and a lower group. The two groups respectively extend to another two FPCs accommodated in the two grooves of the connector 1320, and are electrically connected to the two FPCs. Two wires respectively led out from the two FPCs, go through the two grooves, and are then led out of the touch screen. For example, as shown in FIG. 15, among the electrode wires extending out from the right end of the multi-row sensing (or driving) unit array, the upper group of the electrode wires extends through the area 1123 to the FPC 1133 accommodated in an upper groove of the connector 1320. A wire led out from the FPC 1133 goes through the upper groove and is led out of the touch screen.

A person of ordinary skill in the an can understand that, in other embodiments, similar to the connectors 1310 and 1320, the connector 1330 can also have two grooves used for accommodating two FPCs fixed to a lower strip-shaped area of the non-visible region 1111. In another embodiment, the three connectors 1310, 1320 and 1330 can be connected to form a whole structure, similar to the connector 2310 shown in FIG. 16 or the connector 3310 shown in FIG. 17.

Figure 16:
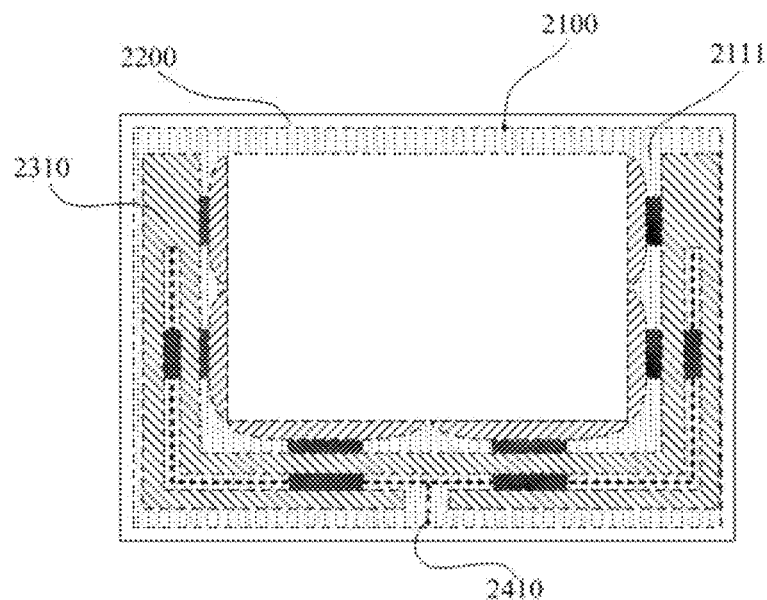
FIG. 16 schematically shows a front view of a touch screen in a fourth embodiment.

In a fourth embodiment shown in FIG. 16, the inner screen 2200 and the outer screen 2100 are connected to each other through a connector 2310. The second surface of the connector 2310 is connected to the surface of the inner screen 2200, while multiple first surfaces of the connector 2310 are connected to the surface of the outer screen 2100. Specifically, these first surfaces are connected to the surface of the non-visible region 2111.

In an embodiment, the connector 2310 is obtained from the connectors 1310, 1320, and 1330 described in the previous embodiments with the following variations. The connectors 1310 and 1320 are extended to a lower strip-shaped area of the non-visible region 1111. Two grooves are also formed in the connector 1330, and the two ends of the connector 1330 are respectively extended to a left strip-shaped area and a right strip-shaped area of the non-visible region 1111. The connectors 1310, 1320 and 1330 are connected in sequence and form an integral structure. A channel penetrating through the connector (or a groove which does not penetrate through the connector) is formed in the connector which is an integral structure. The channel communicates with a plurality of grooves in the connector, and is used for allowing wires of the FPC accommodated in these grooves to extend in the channel. In an embodiment, the channel is provided with an opening facing the exterior of the touch screen, and the opening is provided at one edge of the connector. The wires 2410 can be led out to the outside of the touch screen through the opening. In view of the description of all the connectors in the previous embodiments, the structure, the material and the arrangement of the connector 2310 in this embodiment are clear, and thus the similar contents would not be repeated herein.

Furthermore, in an embodiment, an upper strip-shaped area of the non-visible region of the outer screen is not provided with any electrode wires, which extend from each column of driving/sensing units. A connector can be provided on the upper strip-shaped area, so that the inner screen and the outer screen are connected. One surface of the connector is connected to the inner screen, while the other surface of the connector is connected to the outer screen. Moreover, as shown in FIG. 17, the connector in this embodiment can also form an integral structure with the connector shown in FIG. 16.

Figure 17:
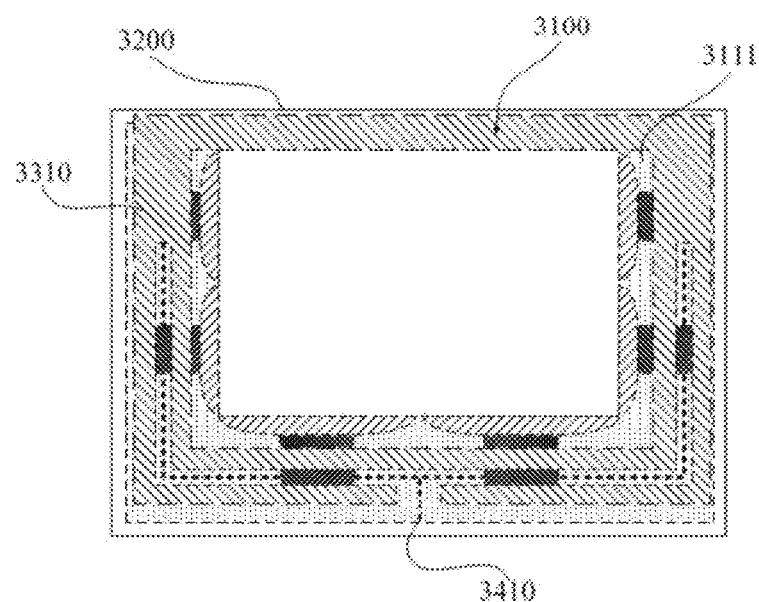
FIG. 17 schematically shows a front view of a touch screen in a fifth embodiment.
Figure 18:
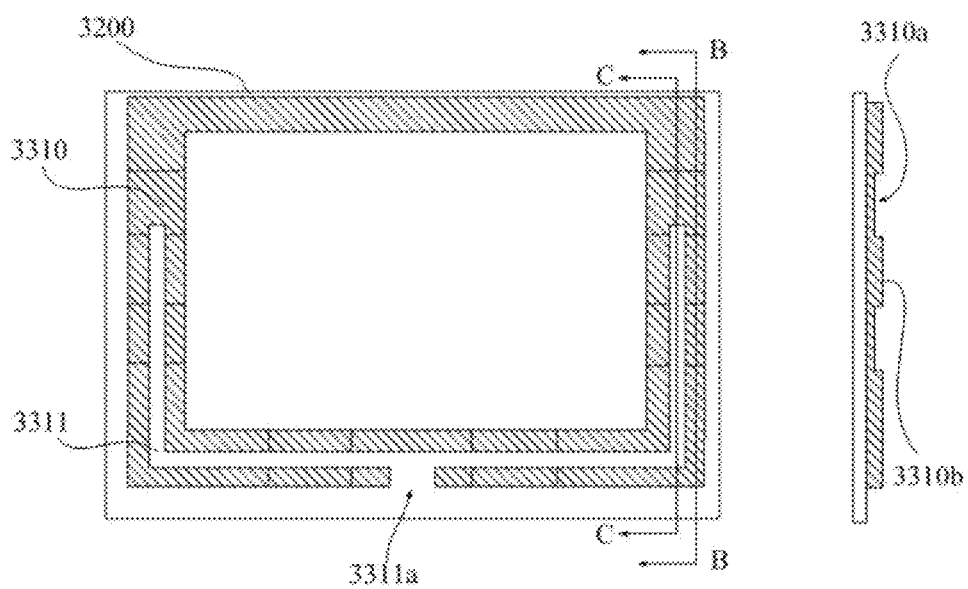
FIG. 18 shows an inner screen of the touch screen shown in FIG. 17 and a connector, the inner screen and the connector being connected to each other.
Figures 19, 20:
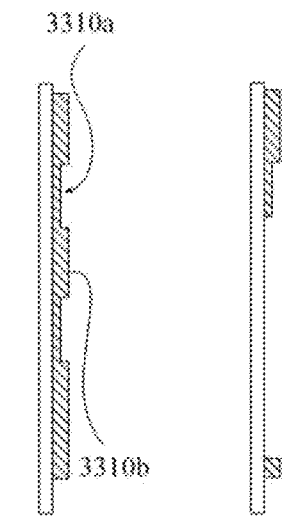
FIG. 19 is a cross-sectional view of the structure in a B-B direction shown in FIG. 18.
FIG. 20 is a cross-sectional view of the structure in a C-C direction shown in FIG. 18.
Figure 21:
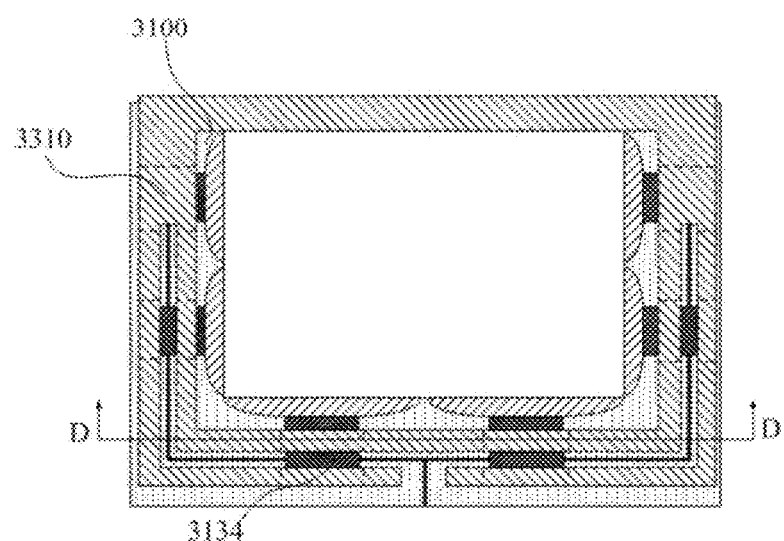
FIG. 21 shows an outer screen of the touch screen shown in FIG. 17 and a connector, the outer screen and the connector being connected to each other.
Figure 22:
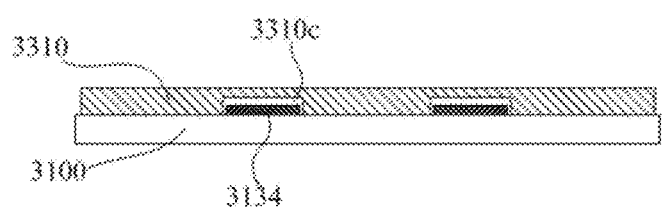
FIG. 22 is a cross-sectional view of the structure in a D-D direction shown in FIG. 21.

In a fifth embodiment shown in FIG. 17, the inner screen 3200 and the outer screen 3100 are connected to each other through a connector 3310. The second surface of the connector 3310 is connected to the surface of the inner screen 3200. A plurality of first surfaces of the connectors 3310 are connected to the surface of the outer screen 3100. Specifically, these first surfaces are connected to the surface of the non-visible region 3111.

As shown in FIGS. 18-22, in this embodiment, the connector 3310 is substantially in the shape of a rectangular frame. An upper portion of the connector 3310 is a uniform long strip-shaped plate, without a groove for accommodating FPC, a channel or a groove. A left portion, a right portion and a lower portion of the connector 3310 are each provided with two grooves used for accommodating the FPCs. On the right portion, there is a first surface 3310b between two grooves (groove 3310a and a groove below the groove 3310a). On the lower portion, there is a first surface between two grooves (the groove 3310c accommodating FPC 3134 and a groove to the right of the groove 3310c). The channel 3311 extends in the connector 3310, to communicate with the grooves. An opening 3311a is provided on the lower portion of the connector 3310, and the opening 3311a faces the exterior of the touch screen. Through the opening 3311a, wires 3410 from all the FPCs are led out of the touch screen.

In this embodiment, the channel is used for accommodating the wires and allowing the wires to extend to the outside of the touch screen. In other embodiments, a person of ordinary skill in the art can understand that, the channel can be replaced with a groove. In this case, a depth of the groove for accommodating and guiding the wires can be the same as or different from the depths of the grooves for accommodating the FPCs. In an embodiment, the depth of the groove for accommodating and guiding the wires is larger than the depths of the grooves for accommodating the FPCs.

Further, when connecting the outer screen, the inner screen, and the connector, in an embodiment, the connector can be connected to the inner screen first, and then the outer screen is connected to the connector. In other embodiments, conversely, the connector is first connected to the outer screen, and then the inner screen is connected to the connector. Either connection sequence applies to the present disclosure.

In an embodiment, the connector is formed by combining a plurality of structural portions. For example, the connector 3310 shown in FIG. 17 can include an upper portion, a left portion, a right portion and a lower portion. In this case, the tour portions can be manufactured separately, to reduce manufacturing difficulty and costs. In addition, it is not required to first connect the four portions to form an integral connector 3310, and then connect the integral connector 3310 to the inner screen and the outer screen. Instead, the four portions can be separately connected to the inner screen and the outer screen one by one. When connecting the portions to the inner screen and the outer screen, in an embodiment, there is a certain gap between the portions, such as 0.2-5 cm away from each other. In this way, the materials, such as a material used to make a connector, a double-sided adhesive tape or an adhesive can be reduced. Additionally, the air between the inner screen and the outer screen, and the outside air are facilitated to circulate, so as to reduce water mists.

The five embodiments above describe connection modes of a touch screen, including an outer screen of a single-piece structure. A touch screen including an outer screen of a fully-attached structure is described hereinafter, with reference to three embodiments. The outer screen of the fully-attached structure and the outer screen of the single-piece structure can adopt same connectors, while only the positions of the connectors with respect to the out screen are different. Thus, the connectors will not be described in detail hereinafter (the related details can be obtained referring to the previous embodiments).

As shown in FIGS. 23 and 24, in a sixth embodiment, the outer screen 4100 and the inner screen 4200 are connected through three connectors 4310, 4320 and 4330. The three connectors and the inner screen herein are the same as the embodiment as shown in FIGS. 7-10. The outer screen 4100 is similar to the outer screen as shown in FIG. 4. The outer screen 4100 includes a touch control layer 4110 and a protection layer 4120. The structure of the touch control layer 4110 is similar to that of the outer screen described in the previous embodiments. The touch control layer 4110 includes a driving unit array and a sensing unit array (not shown) which are arranged in a visible region. A plurality of sequentially-arranged electrode wires from the driving unit array and the sensing unit array extend to the corresponding FPC/FPCs, through a non-visible region 4111 of the touch control layer. The non-visible region 4111 refers to edge parts or a frame part where no driving unit array and no sensing unit array are arranged.

Different from the prior art, electrode wires on the touch control layer 4110 are also grouped and led out, as described in the previous five embodiments shown in FIGS. 7-22. In particular, multiple electrode wires, extending out from the left end of multi-row sensing (or driving) unit array of the touch control layer 4110, are divided into an upper group and a lower group. Multiple electrode wires, extending out from the right end, are also divided into an upper group and a lower group. Multiple electrode wires, extending out from the lower end of multi-column driving (or sensing) unit array of the touch control layer 4110, are divided into a left group and a right group. In an embodiment, the electrode wires led out in groups can occupy less area in the non-visible region than the electrode wires having a layout of the prior art. Thus, the non-visible region of the touch control layer 4110 in this embodiment can be relatively smaller. Compared with the touch screen 10 having both the same driving unit array and sensing unit array in the prior art, the touch control layer 4110 can be smaller. Thus, the touch control layer 4110 is smaller than the protection layer 20, which has substantially the same size as the touch control layer 10. Accordingly, as shown in FIG. 23, the touch control layer 4110 is also smaller than the protection layer 4120, which has substantially the same size as the protection layer 20.

In this embodiment, the touch control layer 4110 of the outer screen 4100 is smaller than the protection layer 4120. The touch control layer 4110 is arranged in the middle of the protection layer 4120, and the touch control layer 4110 and the protection layer 4120 are fully attached. Therefore, in this embodiment, the non-visible region 4111 of the touch control layer 4110 and a non-contact area of the protective layer 4120 are collectively considered as a non-visible region of the outer screen 4100, wherein the non-contact area refers to an area which does not contact with the touch control layer 4110.

In this embodiment, the second surfaces of three connectors 4310, 4320 and 4330 are connected to a surface of the inner screen 4200, wherein the surface of the inner screen 4200 faces the outer screen 4100. The first surfaces of the three connectors 4310, 4320 and 4330 are connected to a surface of the outer screen 4100, wherein the surface of the outer screen 4100 faces the inner screen 4200. Specifically, the three connectors 4310, 4320 and 4330 are connected to the non-visible region of the outer screen 4100. In this embodiment, the three connectors 4310, 4320 and 4330 are connected to an area of the protection layer 4120, wherein the area does not contact with the touch control layer 4110. The arrangement and connection of the first surfaces and the second surfaces with respect to the inner screen and the outer screen, are the same as those described in the embodiment as shown in FIGS. 7-10, and thus are not described in detail herein.

Furthermore, on the outer screen 4100, six FPCs which are used to be respectively electrically connected to the six, groups of electrode wires, can be arranged on the touch control layer 4110. The six FPCs can also be additionally or alternatively arranged on the protection layer 4120. In an embodiment, similar to the embodiment shown in FIGS. 7-10, the six FPCs are arranged on two sides of the three connectors respectively.

As shown in FIGS. 25-27, in a seventh embodiment, a connector 5310 is provided, wherein the connector 5310 is the same as that of the embodiment shown in FIG. 17. Further, structures of the outer screen 5100 and the inner screen 5200 are the same as those of the embodiment shown in FIGS. 23 and 24. Specifically, the outer screen 5100 includes a touch control layer 5110 and a protection layer 5120, and the touch control layer 5110 is smaller than the protection layer 5120. The non-visible region 5111 of the touch control layer 5110 and a non-contact area of the protective layer 5120 are collectively considered as a non-visible region of the outer screen 5100, wherein the non-contact area refers to an area which does not contact with the touch control layer 5110. Six grooves, used for accommodating six FPCs on the outer screen 5100, are formed in the connector 5310. A channel is further formed in the connector 5310 and is used for accommodating wires 5410 from the FPCs. The channel is provided with an opening at a lower portion of the connector 5310, and the opening is used for allowing the wires 5410 from the FPCs to be led out of the touch screen.

In an eighth embodiment shown in FIGS. 28 and 29, structures of an inner screen (not shown and the outer screen 6100 are the same as those of the inner screen and the outer screen in the two embodiments shown in FIGS. 23-27, and thus are not described herein. Electrode wires on the touch control layer 6110 of the outer screen 6100 are divided into six groups and led out to six FPCs respectively. As shown in FIG. 28, the six FPCs are fixed on the non-visible region 6111 of the touch control layer 6110, and are arranged outside the connector 6310. In this embodiment, different from the embodiment shown in FIGS. 25-27, the connector 6310 is not provided with six grooves for accommodating six FPCs.

In this embodiment, the connector 6310 is only provided with a groove for accommodating wires from the FPCs, as depicted with dotted lines in FIG. 28. The layout of the groove is the same as the channel in the embodiment shown in FIG. 25-27. However, instead of the channel penetrating through the whole thickness of the connector shown in FIGS. 25-27, the groove as shown in FIG. 29 is provided. Similarly, the groove of the connector 6310 is also provided with an opening at the lower portion of the connector 6310, and the opening is used for allowing wires 6410 from the FPCs to be led out of the touch screen. In another embodiment, the person skilled in the art will readily appreciate that the connector 6310 of this structure can also be used for connection between the inner screen and the outer screen in the five embodiments shown in FIGS. 7-22.

Moreover, it should be noted that a connector used to connect the inner screen and the fully-attached outer screen (and the first surface of the connector is connected to the protection layer of the outer screen), is thicker than a connector used to connect the inner screen and the outer screen of a single-piece structure. For example, the thickness of the connector used to connect the inner screen and the fully-attached outer screen can be 0.4-3 cm.

The detailed description of the embodiments of the present disclosure are provided above. It should be understood that a person of ordinary skill in the art can make various modifications and changes according to the concept of the present disclosure without creative efforts. Therefore, any technical solutions, obtained by the skilled person in the art based on the prior art, in view of the concept of the present disclosure, through logical analysis, reasoning or limited experiments, will fall within the protection scope determined by the claims.

We claim:

1. A capacitive touch screen, comprising:
   an outer screen, including a driving unit array and a sensing unit array;
   an inner screen;
   a first connector, a second connector, and a third connector, each connector connecting the outer screen to the inner screen, wherein the first connector, the second connector, and the third connector have the same thickness in a range of 0.01 cm-3 cm,
   wherein a first surface of each connector is connected to a surface of a non-visible region of the outer screen, and a second surface of each connector is connected to a surface of the inner screen, wherein each connector is a plastic plate-shaped structure,
   in the non-visible region of the outer screen, a plurality of first electrode wires from a first part of the driving unit array are divided into two first groups, and the at least two first groups of the first electrode wires extend on two sides of the first connector,
   a plurality of second electrode wires from a second part of the driving unit array are divided into two second groups, and the two second groups of the second electrode wires extend on two sides of the second connector,
   a plurality of third electrode wires from the sensing unit array are divided into two third groups, and the two third groups of the third electrode wires extend on two sides of the third connector,
   the first surface of each connector does not contact the plurality of first electrode wires, the plurality of second electrode wires, and the plurality of third electrode wires.

2. The capacitive touch screen according to claim 1, wherein the outer screen includes a touch control layer, and the driving unit array and the sensing unit array are formed on the touch control layer,
   the non-visible region is formed by an edge part of the touch control layer, and the driving unit array and the sensing unit array are not arranged on the edge part.

3. The capacitive touch screen according to claim 1, wherein the outer screen includes a protection layer and a touch control layer,
   the touch control layer is smaller than the protection layer, and the touch control layer is attached to a middle part of the protection layer, the driving unit array and the sensing unit array are formed on the touch control layer, the non-visible region is formed by a first edge part of the touch control layer and a second edge part of the protection layer, the driving unit array and the sensing unit array are not arranged on the first edge part, and the second edge part of the protection layer does not contact the touch control layer.

4. The capacitive touch screen according to claim 1, wherein the non-visible region is in a shape of rectangular frame, and includes a first strip-shaped area, a second strip-shaped area, a third strip-shaped area, and a fourth strip-shaped area;

the first strip-shaped area is opposite to the second strip-shaped area, the third strip-shaped area is opposite to the fourth strip-shaped area, and the third strip-shaped area and the fourth strip-shaped area are between the first strip-shaped area and the second strip-shaped area;

wherein the first connector is connected to a middle part of the first strip-shaped area, the second connector is connected to a middle part of the second strip-shaped area, and the third connector is connected to a middle part of the third strip-shaped area.

5. The capacitive touch screen according to claim 4, wherein each of the first connector and the second connector includes two grooves, each first groove configured to accommodate a flexible printed circuit;

each first group of the first electrode wires is led out to a corresponding flexible printed circuit of the first connector and electrically connected to the corresponding flexible printed circuit of the first connector, each second group of the second electrode wires is led out to a corresponding flexible printed circuit of the second connector and electrically connected to the corresponding flexible printed circuit of the second connector.

6. The capacitive touch screen according to claim 5, wherein the first connector, the second connector, and the third connector are connected in sequence and form an integral structure, wherein the integral structure is further provided with a channel, which is connected to the two grooves, the channel extends in the integral structure, an opening of the channel is formed in one edge of the integral structure, and the opening faces an exterior of the touch screen, a plurality of wires from the flexible printed circuits extend within the channel, and are led out of the touch screen from the opening.

7. A connector, used for connecting between an inner screen and an outer screen of a capacitive touch screen, the connector comprising:

a first surface, wherein only a half portion of the first surface is connected to a surface of the outer screen;

a second surface, configured for being connected to a surface of the inner screen;

two grooves, each groove configured to accommodate a flexible printed circuit; and a channel connecting the two grooves, wherein the channel extends in the connector, an opening of the channel is formed in one edge of the connector, wherein the connector is a plastic plate-shaped structure, and a thickness of the connector is in a range of 0.01 cm-3 cm.

\* \* \* \* \*